United States Patent [19]
Brown

[11] Patent Number: 5,946,849
[45] Date of Patent: Sep. 7, 1999

[54] LEAD-FREE FISHING DEVICES

[76] Inventor: John E. Brown, 8 Northwood Ave., St. Catharines, Ontario, Canada, L2M 4J6

[21] Appl. No.: 08/126,130

[22] Filed: Sep. 24, 1993

Related U.S. Application Data

[63] Continuation of application No. 07/853,846, Mar. 19, 1992, abandoned, which is a continuation of application No. 07/614,486, Nov. 16, 1990, abandoned.

[51] Int. Cl.$^6$ .................................................. A01K 95/00
[52] U.S. Cl. ........................................... 43/44.89; 43/43.1
[58] Field of Search ............................... 43/44.89, 44.87, 43/44.98, 44.99, 17.2, 43.1

[56] References Cited

U.S. PATENT DOCUMENTS

| | | |
|---|---|---|
| 838,511 | 12/1906 | Saunders . |
| 1,072,880 | 9/1913 | Tewes . |
| 1,518,920 | 12/1924 | Halloran . |
| 2,958,287 | 11/1960 | Auzier . |
| 3,003,420 | 10/1961 | Nosler . |
| 3,058,420 | 10/1962 | Tanner et al. . |
| 3,608,230 | 9/1971 | Hribar ................................. 43/44.89 |
| 3,808,725 | 5/1974 | Matsumoto et al. .................. 43/44.98 |
| 4,279,092 | 7/1981 | Hutson ................................ 43/44.89 |
| 4,450,646 | 5/1984 | Maltese .............................. 43/44.81 |
| 4,536,984 | 8/1985 | Kowal ................................. 43/17.2 |
| 4,714,023 | 12/1987 | Brown .................................. 102/516 |
| 4,944,107 | 7/1990 | Wymore ............................... 43/44.89 |
| 4,949,644 | 8/1990 | Brown .................................. 102/498 |
| 5,088,415 | 2/1992 | Huffman et al. ...................... 29/1.23 |

FOREIGN PATENT DOCUMENTS

| | | |
|---|---|---|
| 2196221 | 4/1988 | United Kingdom . |
| 2204471 | 11/1988 | United Kingdom . |
| 2207841 | 2/1989 | United Kingdom ................. 43/44.81 |
| 221980 | 12/1989 | United Kingdom . |

OTHER PUBLICATIONS

Acute nickel intoxication by dialysis. Auth: Webster, JD et al.; Ann Intern Med 1980 May: 92 (5):631–3.
Acute nikel toxicity of electroplating workers who accidently ingested a solution of nickel sulfate and nickel chloride. Auth: Sunderman FW Jr; et al. Am J Ind Med 1988; 14 (3): 257–66.
Investigations on the quantitative determination of nickel and chromium in human lung tissue. Industrial medical, toxicological, and occupational medical expertise aspects. Auth: Raithel HJ et al.; Int Arch Occup Environ Health 1988; 60 (1) 55–66.
Combined toxicity of copper, cadmium, zinc, lead, nickel, and chrome to the copepod Tisbe holothurise. Auth: Verriopoulos G; Dimas S. Bull Environ Cantam Toxical 1988 Sep.: 41 (3): 378–84.
CRC Handbook of Chemistry and Physics; Limits For Human Exposure to Air Contaminants; Fm United States Federal Register vol. 36, No. 105.
Webster's Third New International Dictionary (unabridged) 1391–92 (1986) Webster's dictionary definition of "material".
Encyclopedia of Chemical Technology; Third Edition, vol. 3; Antibiotics (Phenazines) to Bleaching Agents pp. 934–935.
The Washington Post, "Swan Song Becomes a Call to Action", Guy Gugliotta, May 18, 1993.
Metals Handbook vol. 1, 8th ed p. 863, American Society for Metals 1967.

(List continued on next page.)

*Primary Examiner*—Chuck Y. Mah
*Attorney, Agent, or Firm*—Rothwell, Figg, Ernst & Kurz, p.c.

[57] ABSTRACT

A lead-free, underwater fishing device, such as a lure, jig or sinker, at least a portion of which contains bismuth.

17 Claims, 1 Drawing Sheet

OTHER PUBLICATIONS

The influence of pH on the toxicity of aluminum, cadium, and iron to eggs and larvae of the zebrafish, Brachydanio rerio, Dave G; Ecotoxicol Environ Safety 1985 Oct.: 10 (2): 253–67.

Toxicity of chromium (VI) in fish, with special reference to organoweights, liver and plasma enzyme activities, blood parameters and histological alterations. pp. 31–41; Auth. Strik JJ et al.; Koeman JH, ed. Sublethal effects of toxic chemicals on aquatic animals. Amsterdam, Elsevier Scientific, 1975. WA 689 S941 1975.

Chromium: a review of environmental and occupational toxicology. Auth. Bencko V; J Hyg Epidemiol Microbiol Immunol 1985; 29 (1): 37–46.

Acute toxicity of brass particles to Daphnia magna.; Auth. Johnson, DW et al. J Appl Toxicol 1986 Jun.: 6 (3): 255–8.

The toxicity of brass dust to the microalgae Akistrodesmus falcatus and Selenastrum capricornutum.; Auth: Haley MV et al. J Appl Toxicol 1986 Aug.: 6 (4): 281–5.

LEAD-FREE FISHING DEVICES

This is a continuation of application Ser. No. 07/853,846, filed Mar. 19, 1992 which is a continuation of application Ser. No. 07/614,486, filed Nov. 16, 1990 now both abandoned.

BACKGROUND OF THE INVENTION

1. Field of the Invention

The present invention relates to improved fishing devices.

2. Description of the Background Art

Many underwater fishing devices, such as lures, jigs, sinkers and the like, contain lead to provide sufficient density for proper descent of the fishing device in water. Lead also is sometimes provided in fishing devices to provide sufficient weight so that it may be cast long distances by an angler, or to provide for efficient trolling behind a power-driven boat.

While the density, softness and other physical characteristics of lead have made it commercially successful, the toxicity of lead has raised environmental concerns since lead-containing fishing devices are frequently lost during use, which can result in poisoning of the environment and of the animals therein.

There remains a need in the art for completely lead-free fishing devices which perform similarly in use to corresponding fishing devices made with lead.

SUMMARY OF THE INVENTION

In accordance with the present invention, an article for use in catching fish comprises a fishing device, at least a portion of which contains bismuth.

DETAILED DESCRIPTION OF THE PREFERRED EMBODIMENTS

The present invention is applicable to underwater fishing devices, such as fishing lures, jigs, sinkers and the like. In the inventive fishing devices, that portion which conventionally would be made up of lead instead contains bismuth.

Figure 1:
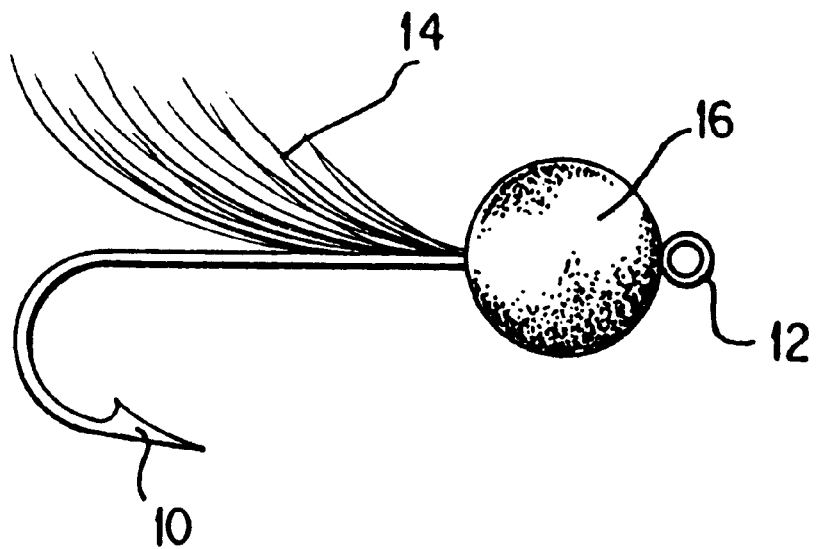
FIG. 1 is a partly schematic, elevational view of a fishing lure according to one embodiment of the present invention.

For example, the lure shown in FIG. 1 includes a fish hook 10, means in the form of eyelet 12 for attachment to a fishing line (not shown), and means for attracting or deceiving a fish such as hackle 14. However, unlike prior art fishing devices, the lure shown in FIG. 1 is provided with a weight-providing element 16 containing bismuth, through which the hook extends.

In a lure such as is shown in FIG. 1, the bismuth-containing portion 16 is spherical in shape and makes up a substantial amount of the total weight of the lure, preferably at least about 50% or more of the total weight of the lure. The weight-providing element can be of any suitable shape, and has a continuous, all-metal structure primarily made up of bismuth. The weight-providing element can be formed by casting, spin molding, dropping, punching or in any other suitable manner, and can be made of substantially pure bismuth. It has also been discovered that bismuth provides an excellent alloy component when combined with other non-toxic metals for forming non-toxic fishing devices. For example, in preferred embodiments, the bismuth-containing elements of fishing devices in accordance with the present invention contain at least about 50% bismuth by weight. In more preferred embodiments, the bismuth-containing elements contain at least about 60%, 70%, 80%, 90% or 95% by weight bismuth.

In particularly preferred embodiments, the bismuth-containing elements of fishing devices according to the invention contain about 98% by weight or more bismuth. For example, an alloy containing about 98% by weight bismuth and about 2% by weight tin or antimony provide fishing devices made therewith with similar performance characteristics as lead.

In other particularly preferred embodiments, the bismuth-containing elements of fishing devices in accordance with the present invention contain about 99% by weight or more bismuth. For example, an alloy of about 99% by weight bismuth and about 1% by weight zinc has about the same density as lead and provides fishing devices made therewith with performance characteristics substantially the same as lead.

Figure 2:
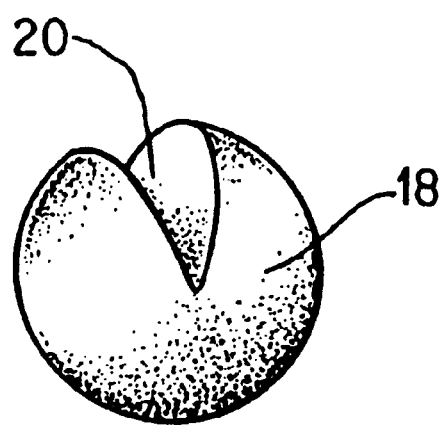
FIG. 2 is a partly schematic, elevational view of a fishing sinker in accordance with another embodiment of the present invention.

FIG. 2 illustrates another embodiment of the present invention, in the form of a bismuth-containing sinker 18, which may be spherical as shown or any other suitable shape. Sinker 18 has a partial slit 20 therein which may be closed around a fishing line (not shown) for attachment thereto. Alternatively, the sinker may be provided with a hole or eyelet therein for attachment to a fishing line.

The present invention can provide underwater fishing devices which have performance characteristics substantially the same as corresponding fishing devices made with lead, but without the poisonous effects of lead on the environment.

Since many modifications, variations and changes in detail may be made to the described embodiments, it is intended that all matter in the foregoing description and shown in the accompanying drawings be interpreted as illustrative and not in a limiting sense.

I claim:

1. An article for use in catching fish comprising non-toxic a lead-free underwater fishing device, at least a portion of said device containing bismuth alloy, the device further including means for attachment to a fishing line and a hook for catching fish.

2. The article of claim 1, wherein the bismuth-containing portion of the device is included as a weight-providing element of said device.

3. The article of claim 2, wherein said weight-providing element has a continuous all-metal structure primarily made up of bismuth.

4. The article of claim 1, wherein the bismuth-containing portion makes up a substantial amount of the total weight of said device.

5. The article of claim 4, wherein the bismuth-containing portion makes up at least about 50% of the total weight of said device.

6. The article of claim 1, wherein the bismuth-containing element further includes tin, antimony, zinc or a mixture thereof.

7. The article of claim 1, wherein the bismuth-containing element is formed by casting, spin molding, dropping or punching.

8. The article of claim 1, wherein the bismuth-containing portion contains at least about 50% by weight or more bismuth.

9. The article of claim 1, wherein the bismuth-containing portion contains at least about 60% by weight or more bismuth.

10. The article of claim 1, wherein the bismuth-containing portion contains at least about 70% by weight or more bismuth.

11. The article of claim 1, wherein the bismuth-containing portion contains at least about 80% by weight or more bismuth.

12. The article of claim 1, wherein the bismuth-containing portion contains at least about 90% by weight or more bismuth.

13. The article of claim 1, wherein the bismuth-containing portion contains at least about 95% by weight or more bismuth.

14. The article of claim 1, wherein the bismuth-containing portion contains at least about 98% by weight or more bismuth.

15. The article of claim 1, wherein the bismuth-containing portion contains at least about 99% by weight or more bismuth.

16. An article for use in catching fish comprising a non-toxic, lead-free underwater fishing device, at least a portion of said device containing bismuth alloy, said device including means for attachment to a fishing line.

17. An article for use in catching fish comprising a non-toxic, lead-free underwater fishing device, the device being a sinker having a continuous all-metal structure primarily made up of bismuth alloy, and means for attachment to a fishing line.

\* \* \* \* \*